United States Patent
Flagg et al.

(10) Patent No.: US 12,169,518 B2
(45) Date of Patent: Dec. 17, 2024

(54) DOCUMENT RETRIEVAL USING INTRA-IMAGE RELATIONSHIPS

(71) Applicant: Georgetown University, Washington, DC (US)

(72) Inventors: Cristopher Flagg, Annandale, VA (US); Ophir Frieder, Chevy Chase, MD (US)

(73) Assignee: Georgetown University, Washington, DC (US)

( * ) Notice: Subject to any disclaimer, the term of this patent is extended or adjusted under 35 U.S.C. 154(b) by 120 days.

(21) Appl. No.: 17/722,156

(22) Filed: Apr. 15, 2022

(65) Prior Publication Data

US 2022/0342928 A1    Oct. 27, 2022

Related U.S. Application Data

(60) Provisional application No. 63/175,972, filed on Apr. 16, 2021.

(51) Int. Cl.
| | | |
|---|---|---|
| *G06F 16/532* | (2019.01) | |
| *G06F 16/538* | (2019.01) | |
| *G06F 16/56* | (2019.01) | |
| *G06F 16/583* | (2019.01) | |
| *G06V 10/26* | (2022.01) | |
| *G06V 10/74* | (2022.01) | |
| *G06V 10/75* | (2022.01) | |

(Continued)

(52) U.S. Cl.
CPC .......... *G06F 16/532* (2019.01); *G06F 16/538* (2019.01); *G06F 16/56* (2019.01); *G06F 16/583* (2019.01); *G06V 10/267* (2022.01); *G06V 10/75* (2022.01); *G06V 10/761* (2022.01); *G06V 10/771* (2022.01); *G06V 10/82* (2022.01); *G06V 20/70* (2022.01)

(58) Field of Classification Search
None
See application file for complete search history.

(56) References Cited

U.S. PATENT DOCUMENTS

| | | | |
|---|---|---|---|
| 11,715,283 B2* | 8/2023 | Chen ................ | G06V 10/7715 |
| | | | 382/195 |
| 2006/0101060 A1* | 5/2006 | Li ................... | G06F 16/90335 |
| | | | 707/E17.02 |

(Continued)

OTHER PUBLICATIONS

Xinlei Chen, Hao Fang, Tsung-Yi Lin, Ramakrishna Vedantam, Saurabh Gupta, Piotr Dollár, and C Lawrence Zitnick, "Microsoft COCO Captions: Data Collection and Evaluation Server," arXiv preprint arXiv:1504.00325, 2015.

(Continued)

*Primary Examiner* — Giuseppi Giuliani
(74) *Attorney, Agent, or Firm* — Klarquist Sparkman, LLP

(57) ABSTRACT

Technologies are described for retrieving documents using image representations in the documents and is based on intra-image features. The identification of elements within an image representation can allow for deeper understanding of the image representation and for better relating image representations based on their intra-image features. The intra-image features present in image representations can be used in searches. Search results can further be reranked to improve search results. For example, reranking can allow search results to conform to intra-image dominant image features.

20 Claims, 11 Drawing Sheets

(51) Int. Cl.
  *G06V 10/771* (2022.01)
  *G06V 10/82* (2022.01)
  *G06V 20/70* (2022.01)

(56) References Cited

U.S. PATENT DOCUMENTS

| | | | | |
|---|---|---|---|---|
| 2019/0251612 | A1* | 8/2019 | Fang | G06Q 30/0643 |
| 2020/0160558 | A1* | 5/2020 | Urtasun | G06F 18/21355 |
| 2021/0049202 | A1* | 2/2021 | Liu | G06F 16/58 |
| 2021/0056609 | A1* | 2/2021 | Mane | G06Q 30/0629 |
| 2021/0319243 | A1* | 10/2021 | Jin | G06T 7/11 |
| 2022/0027732 | A1* | 1/2022 | Arslan | G06F 18/10 |
| 2022/0284600 | A1* | 9/2022 | Brigden | G06T 7/85 |
| 2023/0260249 | A1* | 8/2023 | Dunay | G06V 10/761 |
| 2023/0325434 | A1* | 10/2023 | Chan | G06F 16/538 |
| | | | | 707/723 |

OTHER PUBLICATIONS

Ross Girshick, "Fast R-CNN," In *Proceedings of the IEEE international conference on computer vision*, pp. 1440-1448, 2015.
Kaiming He, Xiangyu Zhang, Shaoqing Ren, and Jian Sun, "Deep Residual Learning for Image Recognition," In *Proceedings of the IEEE conference on computer vision and pattern recognition*, pp. 770-778, 2016.
Kaiming He, Georgia Gkioxari, Piotr Dollár, and Ross Girshick, "Mask R-CNN," In *Proceedings of the IEEE international conference on computer vision*, pp. 2961-2969, 2017.
Alexander Hermans, Lucas Beyer, and Bastian Leibe, "In Defense of the Triplet Loss for Person Re-Identification," *arXiv preprint arXiv:1703.07737*, 16 pages, 2017.
Tsung-Yi Lin, Michael Maire, Serge Belongie, James Hays, Pietro Perona, Deva Ramanan, Piotr Dollár, and C Lawrence Zitnick, "Microsoft COCO: Common Objects in Context," In *European conference on computer vision*, pp. 740-755. Springer, 2014.
Shaoqing Ren, Kaiming He, Ross Girshick, and Jian Sun, "Faster R-CNN: Towards Real-Time Object Detection with Region Proposal Networks," In *Advances in neural information processing systems*, pp. 91-99, 2015.
Florian Schroff, Dmitry Kalenichenko, and James Philbin, "FaceNet: A Unified Embedding for Face Recognition and Clustering," In *Proceedings of the IEEE conference on computer vision and pattern recognition*, pp. 815-823, 2015.
Christian Szegedy, Wei Liu, Yangqing Jia, Pierre Sermanet, Scott Reed, Dragomir Anguelov, Dumitru Erhan, Vincent Vanhoucke, and Andrew Rabinovich, "Going Deeper with Convolutions," In *Proceedings of the IEEE conference on computer vision and pattern recognition*, pp. 1-9, 2015.
Christian Szegedy, Vincent Vanhoucke, Sergey Ioffe, Jonathon Shlens, and Zbigniew Wojna,"Rethinking the Inception Architecture for Computer Vision," 2016 IEEE Conference on Computer Vision and Pattern Recognition, pp. 2818-2826, 2015.
Osman Tursun, Cemal Aker, and Sinan Kalkan, "A Large-scale Dataset and Benchmark for Similar Trademark Retrieval," *arXiv preprint arXiv:1701.05766*, 33 pages, Oct. 17, 2017.
Yuxin Wu and Alexander Kirillov and Francisco Massa and Wan-Yen Lo and Ross Girshick, "Detectron2," https://github.com/facebookresearch/detection2, 4 pages, 2019.
Saining Xie, Ross Girshick, Piotr Dollár, Zhuowen Tu, and Kaiming He, "Aggregated Residual Transformations for Deep Neural Networks," In *Proceedings of the IEEE conference on computer vision and pattern recognition*, pp. 1492-1500, 2017.

* cited by examiner

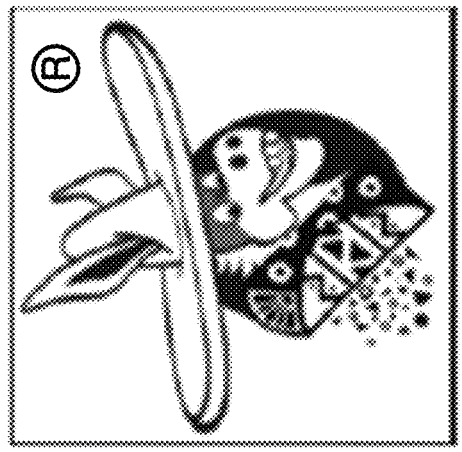
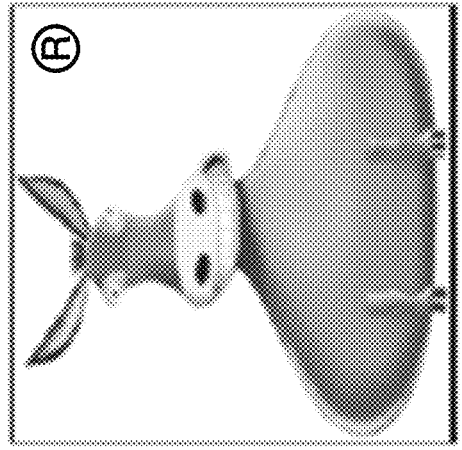
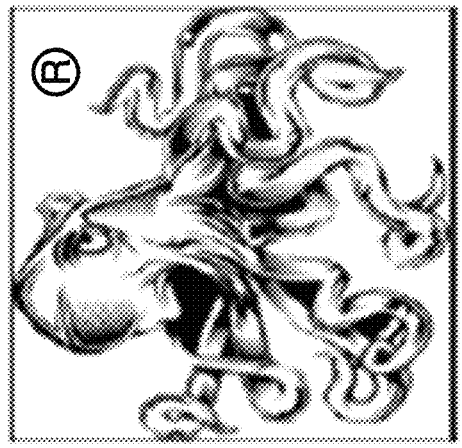
600
610
620
FIG. 6A
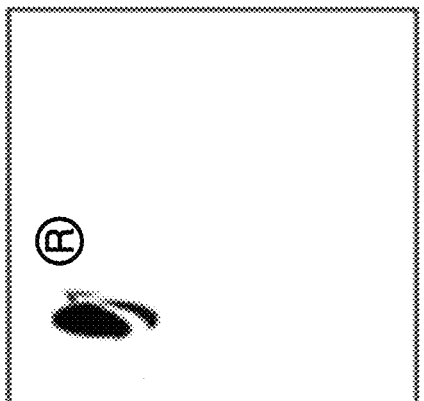
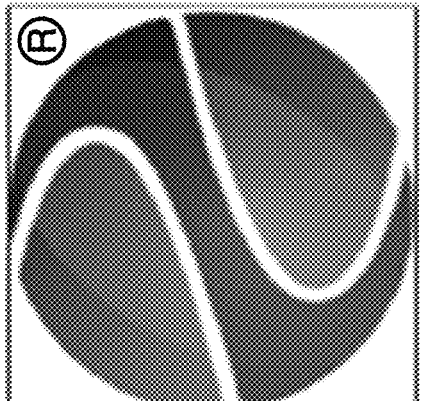
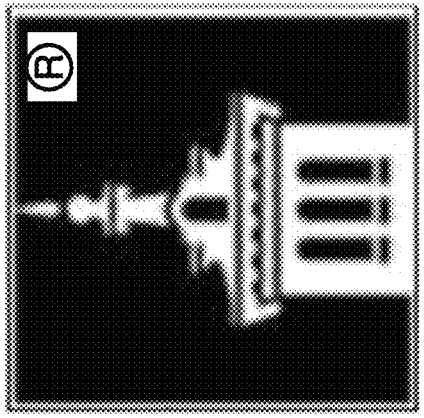
630
640
650
FIG. 6B

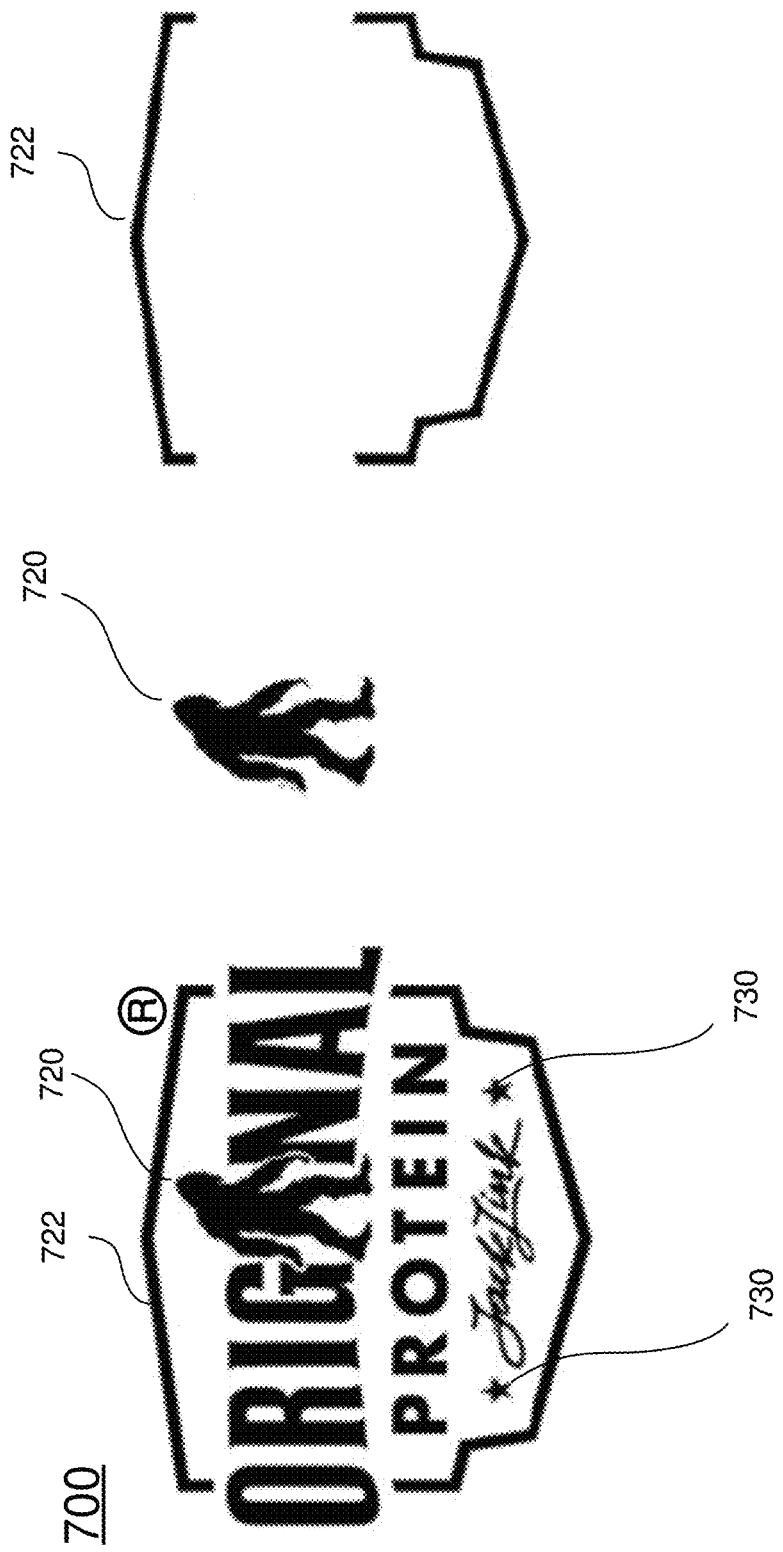

DOCUMENT RETRIEVAL USING INTRA-IMAGE RELATIONSHIPS

RELATED APPLICATIONS

This application claims priority of U.S. Patent Application No. 63/175,972 filed Apr. 16, 2021, and entitled, "DOCUMENT RETRIEVAL USING INTRA-IMAGE RELATIONSHIPS," which is incorporated herein by reference.

FIELD

This application relates to the field of document retrieval in general. More specifically, this specification applies to retrieving documents using images in the documents and is based on intra-image features.

BACKGROUND

Current image search techniques require exact matching. For example, with a query image (image used as basis to search for similar images) that has an image of an object, typical search engines can only find images with similar objects based on pixel-by-pixel comparison. These search engines do not match the query image to images that contain objects with similar concepts. For example, the typical search engines having an image with a photo of a crown as a query cannot find images with an artistic or stylized representation (e.g., sketch or abstract drawing) of a crown.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for retrieving documents using images in the documents and are based on intra-image features. The identification of elements within an image can allow for deeper understanding of the image and for better relating images based on their intra-image features. The intra-image features present in images can be used in searches. Search results can further be reranked to improve the quality of the search results. For example, reranking can allow the search results to conform to intra-image dominant image features. Reranking can likewise allow for the emphasis (increasing) and deemphasis (lowering), namely weighting, of image features.

In some implementations, a method of the present disclosure comprises obtaining an image representation as input, generating one or more latent space representations based on the image representation, generating one or more feature vectors based on the one or more latent space representations, and matching the one or more feature vectors to one or more other feature vectors. In some implementations, the method can further comprise retrieving a document having one or more associated feature vectors matched with the one or more generated feature vectors.

In some implementations, a method of the present disclosure comprises obtaining an image representation as input, generating one or more segments based on the image representation, generating one or more latent space representations based on the one or more segments, generating one or more feature vectors based on the one or more latent space representations, and matching the one or more feature vectors to one or more other feature vectors. In some implementations, the method can further comprise retrieving a document having one or more associated feature vectors matched with the one or more generated feature vectors.

BRIEF DESCRIPTION OF THE DRAWINGS

FIGS. 6A and 6B depict more examples of anchor image, positive image and negative image.

FIG. 7 depicts an example of image dominant features.

DETAILED DESCRIPTION

Figure 1:
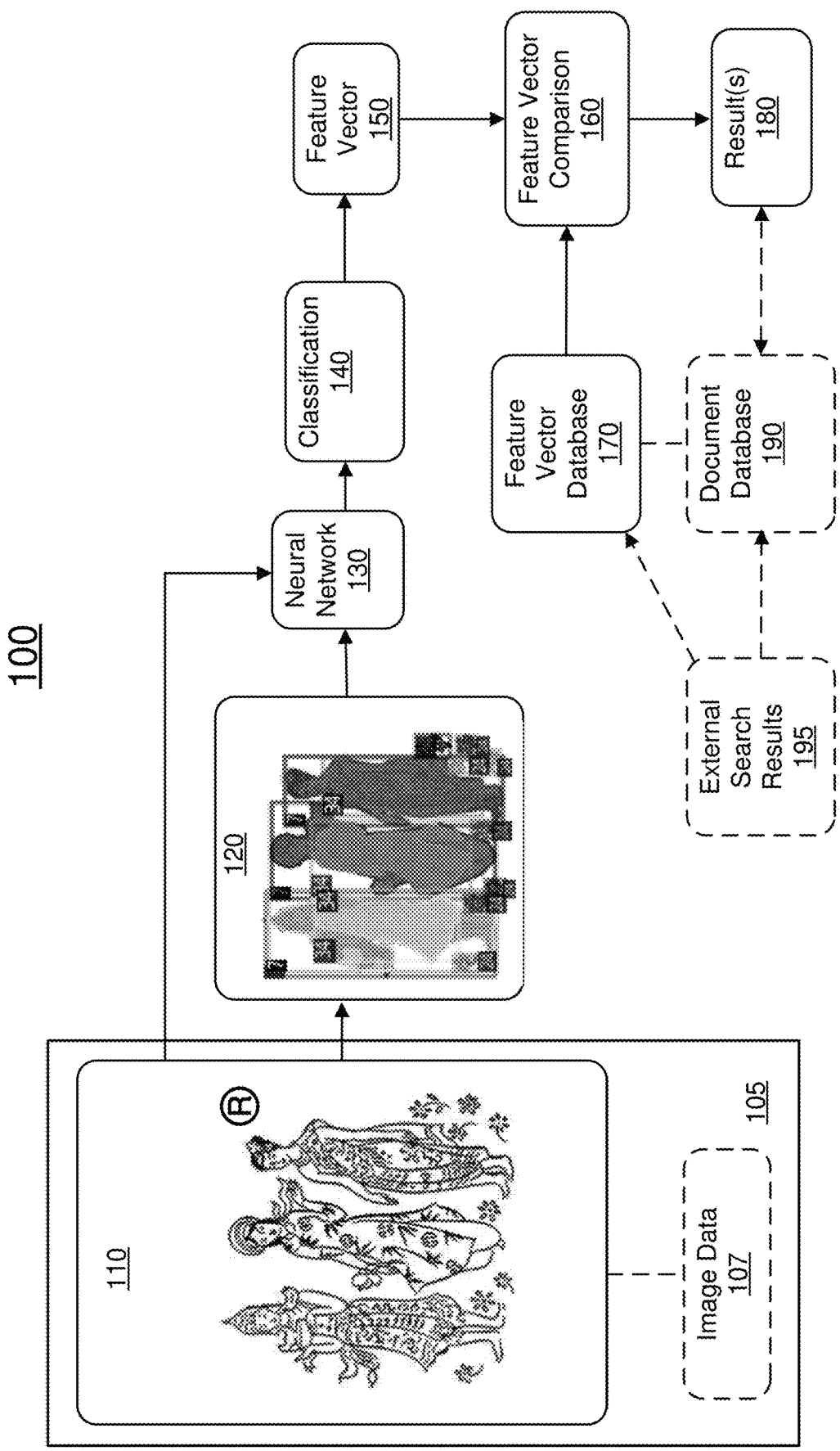
FIG. 1 is an example environment for determining conceptually similar images using intra-image relationships.

The following description is directed to technologies for retrieving documents using images in the documents and is based on intra-image features. In typical search engines where the query and the documents contain images, the images are compared pixel by pixel. For example, the typical search engines having an image with a photo of a car as a query cannot find images with an artistic or stylized representation (e.g., sketch or abstract drawing) of a car.

The technologies described herein provide improvements over such typical search solutions. For example, the techniques described in the present disclosure can improve current technologies by working with images at conceptual levels, rather than at pixel levels. Images, image annotations, image segmentations, differing levels of image detail, intra-image features, image label regions, or portions of images, and the like, used within this technology are broadly referred to as image representations. For example, the intra-image features and their information can form concepts that can be encoded in one or more feature vectors. The one or more feature vectors of different images can then be compared to determine their similarity. The one or more feature vectors can be encoded with different granularities, for example, different levels of image segmentations and concepts. In an example, one or more feature vectors of an image of a beach can be encoded at a very high conceptual level, describing a blue element and a tan element. At a lower conceptual level, the one or more feature vectors can be encoded describing a water body element and a land body element. At an even lower conceptual level, the one or more feature vectors can be encoded describing the water body having wave elements of various details, and the land body having sand elements of various textures. This example is not limiting. Other examples can have other types of segmentations and elements, other number of conceptual levels and different levels of details.

In some implementations, intra-image analysis can include image localization to identify objects within an image, for example, with a bounding box or region of interest (ROI) around an object. The process can include classification and localization of multiple objects within an image. Once the objects have been detected, instance segmentation can be performed to create a mask over the object(s). For example, an ROI estimate can be used to generate a mask over the pixels that contain the object.

In some examples, once each instance of a class is identified, it can be annotated. Annotation can define a set of points around the perimeter of an instance within an image. If multiple instances of the class are present in an image, multiple perimeters can be defined, creating multiple distinct annotations. Densely packed instances with overlapping instances that may not be individually identifiable can be coded as "crowds". This indicates that within the annotation area multiple instances of the class exist. Multi-part annotation can be used in some examples where objects overlap (e.g., a sword placed behind a shield, or a bottle placed behind a banner). For example, the instance in question can be divided into multiple parts. Each of these parts can be annotated together (e.g., indicated by the same color) and the resulting entry (e.g., in a dataset) can include both parts in a single annotation. In some example implementations, up to four instances of a multi-part object can be allowed. But other number of instances are also contemplated.

In some implementations, annotations can further be refined. For example, to identify the best annotations, a group consensus method (gold standard annotation) can be used. The annotations can be generated separately, then are grouped into groups. While the annotations from each group can generally be similar, the choice of a gold standard annotation for a specific image and classification can require one of three sets of annotations to be considered the best. This can be achieved through an automated comparison of the groups of annotations. For each class within an image, the annotation from each group is chosen. The gold annotation is the annotation that, when compared with the other two annotations, yields the highest Intersection over Union (IoU) for the annotation set.

Intersection over Union can be used, for example in a neural network, as an evaluation metric to compare a predicted region of interest to a ground truth region of interest. The region of interest can be either a bounding box or an instance segmentation. The amount of overlap between the ground truth and the prediction can be considered the intersection. This can represent how much of the true value of the region of interest can be represented by the prediction. The union of the two regions can provide an estimate of how much the prediction over-estimates the ground truth. When the value of the intersected regions is divided by the union of the regions, the resulting value can be an estimate of how close the prediction is to the ground truth.

In some implementations, each group of annotations for a specific classification can be tested as the gold annotation against the other two groups of annotations. As annotations are grouped by class, the differences in the use of individual, crowd, and multi-part annotations between annotations is not an issue. The collection of annotations for a specific classification can be used to determine the IoU.

In some implementations, there can be strong similarities between annotations. In these examples, if two matched groups of annotations strongly match, there can be no need to collect a third set of annotations. When two out of the three groups have reported annotations for a class, they can be immediately compared. If the IoU between annotations is above a certain threshold, for example 0.80, the gold label can be determined by either the highest IoU when comparing one against the other or the larger area if the two IoUs are the same. The threshold can be determined on whether two sets of annotations are "essentially the same" based on an inspection of the annotations overlaid on the image. The inspection can be done visually, manually or via automated means.

As images can include multi-label assignment of elements, and each image may contain multiple class instances, the co-occurrence of instances within a class can give important insight into the underlying relationships present in the data.

Additionally, the technologies described herein also provide improvements with the use of neural networks. For example, neural networks can use information about the image (e.g., a classification or label of the image content) to encode the images and the labels into a vector representation that can improve search results. In an example, simply encoding the label "car" with a picture of a car may allow images of cars to be retrieved but does not ensure the cars in the search results share similar properties. This inter-image label problem is compounded when more complex images with multiple labels are considered. Image datasets can include a label region for each label that indicates the location of the label within the image. With respect to retrieval, the locality and relative placement of the label regions within an image can outweigh the similarity between the label regions of the image. For example, having an image labeled both "car" and "tree", techniques can rank images that share these labels and are visually similar more closely than images where the "car" label region and "tree" label region portions of the images are strongly similar but not in the same spatial orientation. If the location of the tree is moved from one side of the car to the other side of the car, images that share a strong conceptual similarity can still be locally dissimilar.

In some implementations, using a combination of images, labels, and proposed label regions, the inter-image data can be used to overcome the locality problems associated with multi-label image document retrieval. Label regions within the image can first be extracted. Since label regions all share the same label, clustering of label regions can be used to identify similarity. These clustered results can then be aggregated for each image as part of the retrieval process. Image retrieval of multi-labeled images can be improved when locality becomes less important than the similarity between elements within the images.

In some implementations, an image neural network can be used to obtain initial search results set. Then a second one-shot metric learning network can be used to rerank the initial search results. With a zero-shot learning network, there can be no need for retraining the neural network model each time a new dataset is received. Once the model of the present disclosure has been trained, a single image can be received as input and one or more feature vectors can be generated. The one or more feature vectors describe the image, for example, by encoding the concepts and items within the image. Thus, the one or more feature vectors can be said to capture the concepts of similarity, when used in retrieval.

In some implementations, as the images used in training can be multi-label, the standard loss function is Binary Cross-Entropy. The network predictions can be in the form of a binary vector where a one can represent membership in a particular classification and a zero can indicate that the image does not belong to that class. Optionally, to address classification imbalance, a per-class weighting factor $p_c$ can provide a weight based on the number of images with membership in that classification as in the following formula:

$$\ell(x,y) = \{l_{1,c}, \ldots, l_{N,c}\}^T,$$

$$l_{n,c} = -w_{n,c}[p_c y_{n,c} \cdot \log \sigma(x_{n,c}) + (1-y_{n,c}) \cdot \log(1-\sigma(x_{n,c}))]$$

In some implementations, to further improve the robustness of the training data, several augmentations to the image can be used. First, since the similarity of an element may not be restricted by the direction the element is facing, a horizontal flip can be added to the training images, for example with a 10% probability. Additionally, since images may occur as white drawings on black backgrounds or black drawings on white backgrounds, the colors of the images can be inverted, for example with a 10% probability. This probability can roughly represent the number of white lines on black background images in the training set.

In some implementations, when one feature of an image can be more significant than another feature, greater weight can be given to the dominant feature for purposes of determining similarity. In an example, all image elements can be considered when determining which segment is dominant. These considerations can vary per implementations.

In some implementations, an image can be encoded with one or more feature vectors containing information on locations within the image. The number of locations can vary, for example, 128 locations or 256 locations. Each location in an image can be compared to determine its similarity with a location in another image.

In some implementations, a neural network model can be trained based on concepts of images. For example, the neural network can be trained to determine that images with conceptually similar elements as similar images, and images with conceptually dissimilar elements as dissimilar images.

FIG. 1 depicts an example environment 100 for determining conceptually similar images using intra-image relationships for document retrieval. The example environment 100 includes an example input image representation 110. In this example, the image representation 110 is taken from a document 105, such as a registered trademark, that is accessible from the public database at the United States Patent and Trademark Office. The trademark image representation 110, and other marks used herein, are used only for the purpose of illustration. In some examples, the image representation 110 can include associated data 107. The data 107 can include descriptions for the image representation 110. For example, the data 107 can include descriptions and/or serial number for the document 105. The example image representation 110 can include multiple annotated (or labeled) segments in 120, or the segmentation 120 can be generated from the image representation 110. The image representation 110 or the annotated segmentation 120 can be inputted into a neural network 130, e.g., an image neural network. The neural network 130 can classify (at 140) the image representation 110 or the annotated segmentation 120 and transform the image representation 110 or the annotated segmentation 120 into one or more feature vectors 150. The one or more feature vectors 150 can be used to assess the similarity of image representations. In this example, the one or more feature vectors 150 can be used in a document retrieval. For example, the one or more feature vectors 150 can be compared (at 160, e.g., using the one or more feature vectors 150 as a query vector in a search engine) with one or more feature vectors stored in a vector database (or library) 170. In some implementations, the search result 180 from the comparison can include one or more vector features most matched with the one or more feature vectors 150. The search result 180 can be used to search a document database 190, for example, for the document(s) associated with the one or more feature vectors in the search result 180. In some implementations, the feature vector database 170 can be coupled to document database 190. In some implementations, the one or more feature vectors 150 can be added to the document database 190 as metadata. The document database 190 can include any type of document, for example, texts, images, trademarks, etc.

In some implementations, the image representation 110 can be the entire example image and can be inputted directly into a neural network 130, e.g., an image neural network.

In general, the techniques of the present disclosure can produce similar feature vectors for similar image representations and produce dissimilar feature vectors for dissimilar image representations. The techniques of the present disclosure can also produce similar feature vectors for image representations that contain similar conceptual elements and produce dissimilar feature vectors for image representations that do not contain similar conceptual elements. The determination of similarity can also be based on classification, text, other criteria.

In some implementations, the one or more feature vectors can be generated offline. Then comparison of the one or more feature vectors can be performed at the time of search. In some implementations, the one or more feature vectors can be generated at time of search.

Figure 2:
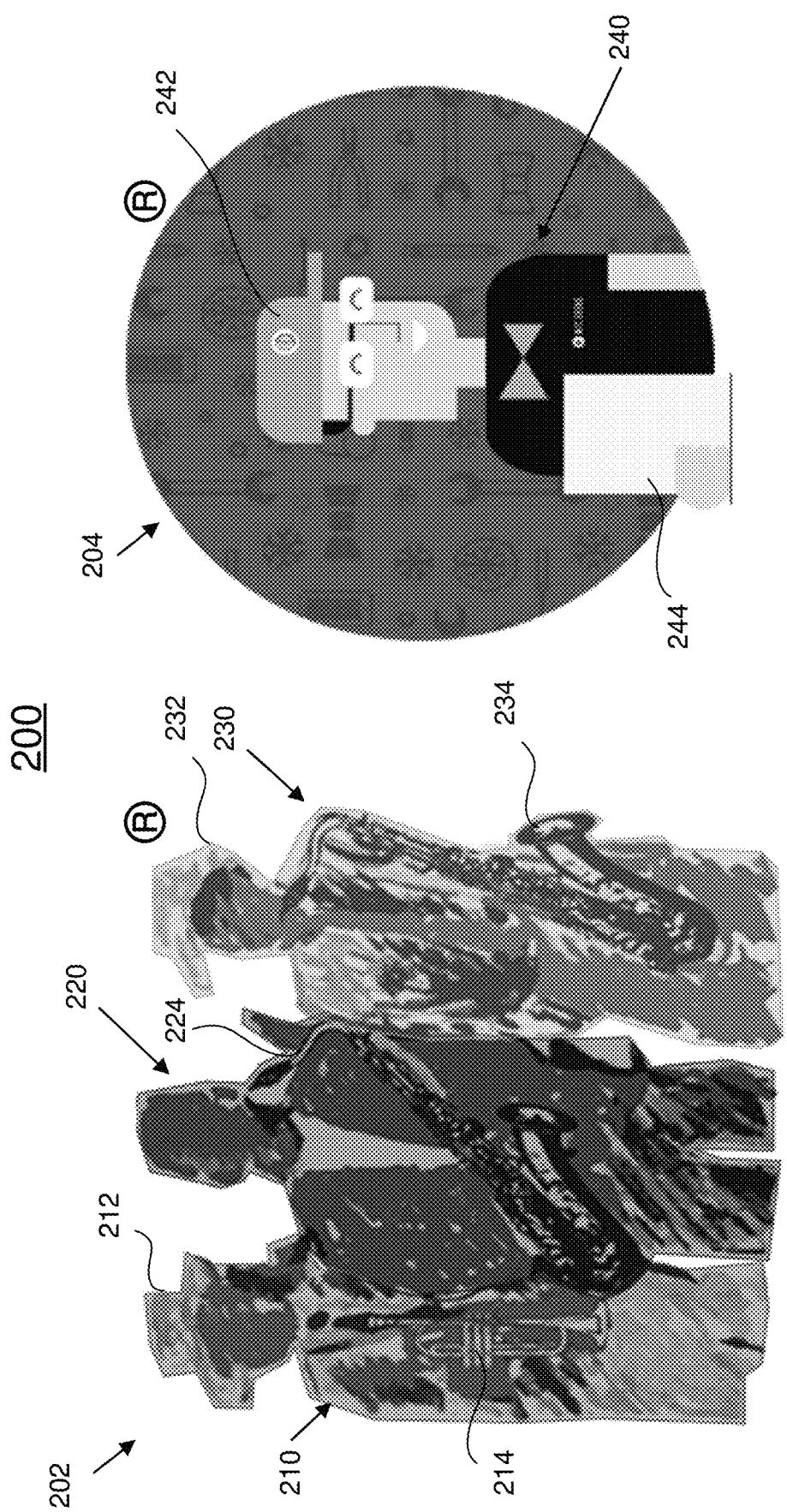
FIGS. 2A and 2B depict an example for determining conceptually similar images using intra-image relationships.

FIGS. 2A and 2B depict an example 200 for determining conceptually similar images using intra-image relationships. Typical pixel by pixel comparison techniques would determine that the image representation 202 in FIG. 2A and image representation 204 FIG. 2B are dissimilar. They cannot provide further granularity in comparisons. Using the techniques of the present disclosure, the example image representation 202 in FIG. 2A can be determined to contain conceptual elements identified as a person element 210, a person element 220, and a person element 230. Other conceptual elements identified can include, but are not limited to, a hat element 212, a hat element 232, a musical instrument element 214, a musical instrument element 224, and a musical instrument element 234. The example image representation 204 in FIG. 2B can be determined to contain conceptual elements identified as a person element 240. Other conceptual elements identified can also include, but are not limited to, a hat element 242 and an object element 244. In some examples, image representation 202 can be determined to be conceptually similar to image representation 204 because they both include, for example, at least a hat element, although the hats do not look similar and are not in the same location.

The process of identifying the pixels that contain specific conceptual elements, such as relating the set of pixels in the hat element 212 to the classification "hat", is called annotation. Images can be annotated to show which conceptual elements are located at which pixels in the image, e.g., in the image representation 202, pixels for the hat elements 212 and 232 can be annotated as the "hat" classification, and the musical instrument element 214 can be annotated as the "musical instrument" classification. When an image contains multiple annotations with multiple classifications, the style of classification is considered a multi-label classification.

In some implementations, in a comparison process, a latent space can characterize that the pixels in the hat elements 212 and 232 in image representation 202 as being close to the pixels in the hat element 242 in image representation 204, because they belong to the hat element. Similarly, the pixels in the person elements 210, 220 and 230 can be characterized in the latent space as being close to the pixels in the person element 240 in image representation 204, because they belong to the person or people element. The close proximity of the elements in the latent space can indicate that the images are similar. A latent space can characterize an image representation, which may include elements within an image or an image as a whole.

On the other hand, the pixels in the musical instrument elements 214, 224, and 234 in image representation 202 can be characterized as being far apart from the pixels in the object element 244 in image representation 204, because the object in element 244 does not belong to the musical instrument element. The techniques can recognize that although the musical instruments 214, 224, and 234 in image representation 202 and the paper or clipboard object 244 in image representation 204 are similarly situated (e.g., being held by the person, in front of the person), they are still characterized far apart in the latent space.

In some implementations, during a neural network model training, the characterization process can include adjusting the distance representations of various elements within one or more latent space representations. For example, the distance representation for similar elements can be adjusted closer as needed, or the distance representation for dissimilar elements can be adjusted further as needed. Once the training has been completed, the model can include a one or more latent space representations having various concepts of various elements. In the example of FIGS. 2A and 2B, when the image representations 202 and 204 are used in training, the one or more latent space representations in the trained model can include a concept of hat, a concept of a person, etc. For example, when the model is used in a document search, searching for one or more documents containing image representation 202, image representation 204 can also be returned, because the model can determine that image representation 202 and image representation 204 are similar, as they both contain at least one similar element. This is an improvement over typical search engines which cannot see image representation 202 and representation 204 as being similar (e.g., they may see image representation 202 as containing line images and image representation 204 as containing block image). On the other hand, the techniques of the present disclosure can overcome differences in image styles and types (e.g., photographs, line drawings, block drawings, caricatures, etc.). In some implementations, the techniques of the present disclosure can impose a threshold of similarity and return only those documents whose similarity exceeds the given threshold. In some implementations, the techniques of the present disclosure can return the top N, according to similarity, ranked documents where N is a predetermined count.

In the example 200, an image of a person holding a musical instrument (not shown) would be determined to be closer to the image representation 202 than the person in image representation 204 is. Another image of a person holding a flute to his/her mouth would be determined to be closer to the image representation 202 than the person holding a guitar only in the hands, because the person elements 210, 220, and 230 hold their instruments 214, 224, and 234 to their mouths. In some implementations, an image of a person holding a non-musical instrument item to his/her mouth (not shown) can be determined to be closer to the image representation 202 than the image representation 204 is. In some implementations, an image of a person holding his/her empty hands to his/her mouth (not shown) can be determined to be closer to the image representation 202 than the image representation 204 is, but not as close to the image representation 202 as an image of a person holding a non-musical instrument item to his/her mouth is.

Figure 3:
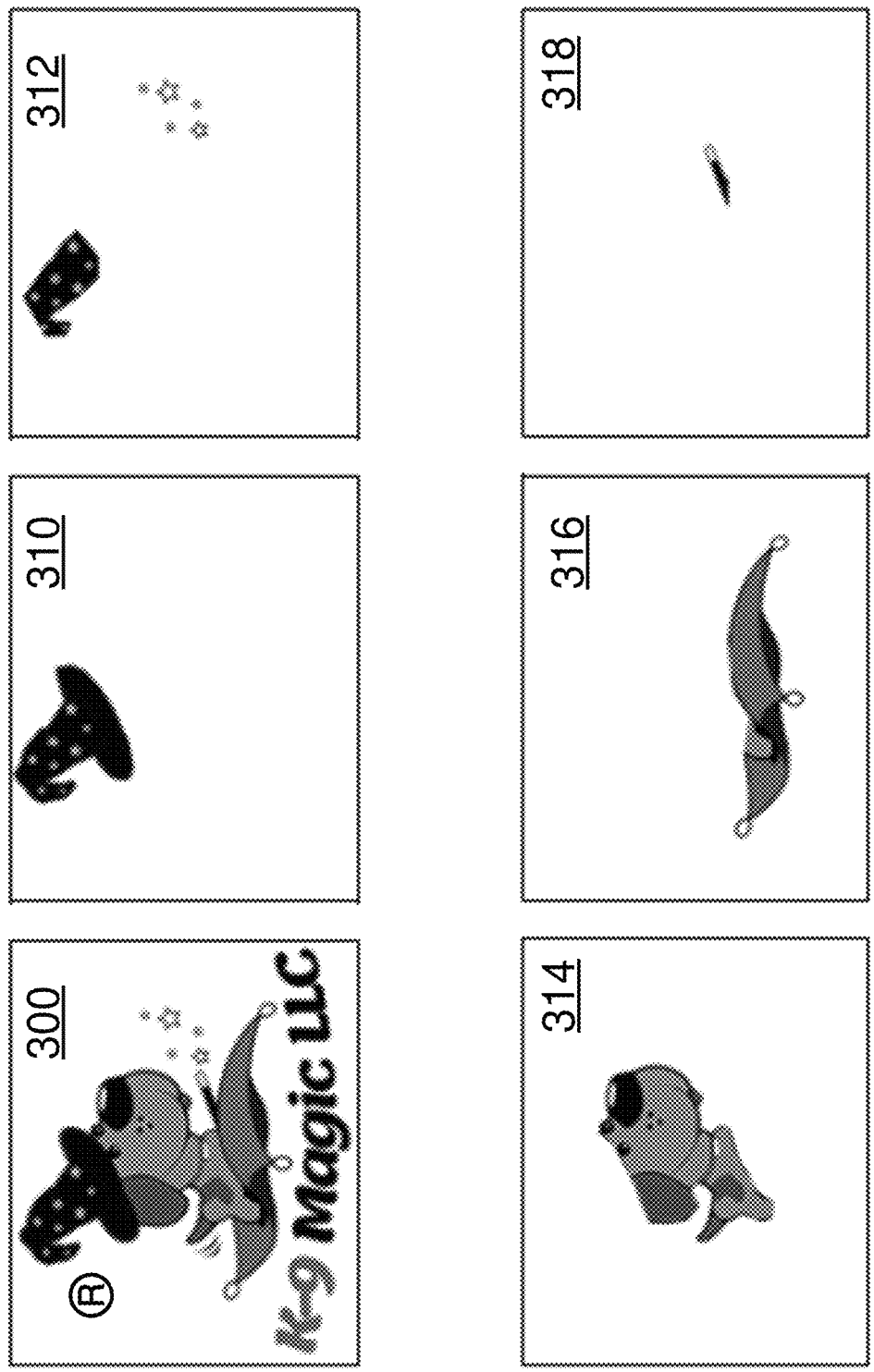
FIG. 3 depicts an example of multi-label classification.

FIG. 3 depicts an example of multi-label classification 300. In some implementations, images can be annotated with multiple classifications, each annotation having a corresponding image segmentation that defines that portion of the image representation. This can result in a binary classification vector. In FIG. 3 example, the full image 300 can be segmented into multiple segments 310-318. Segment 310 can be annotated as a headwear class. Segment 312 can be annotated as a stars or comets class. Segment 314 can be annotated as a class including cats, dogs, wolves, foxes, bears, lions, and tigers. Segment 316 can be annotated with a clothing class. Segment 318 can be annotated as a musical instruments and accessories class.

In some implementations, one or more feature vectors can encode one or more latent space representations in an image. For example, the one or more latent space representations can be high dimensional spaces that can be used to identify the similarities and differences between image representations. The one or more latent space representations can further determine the level of similarity between image representations. For example, one or more latent space representations can be analyzed (e.g., compared) and items that have a shorter distance between them can be determined to be more similar than items that have a longer distance between them. In some implementations, items within an image representation that have a shorter distance between them can be determined to be more related than items that have a longer distance between them.

Figure 4:
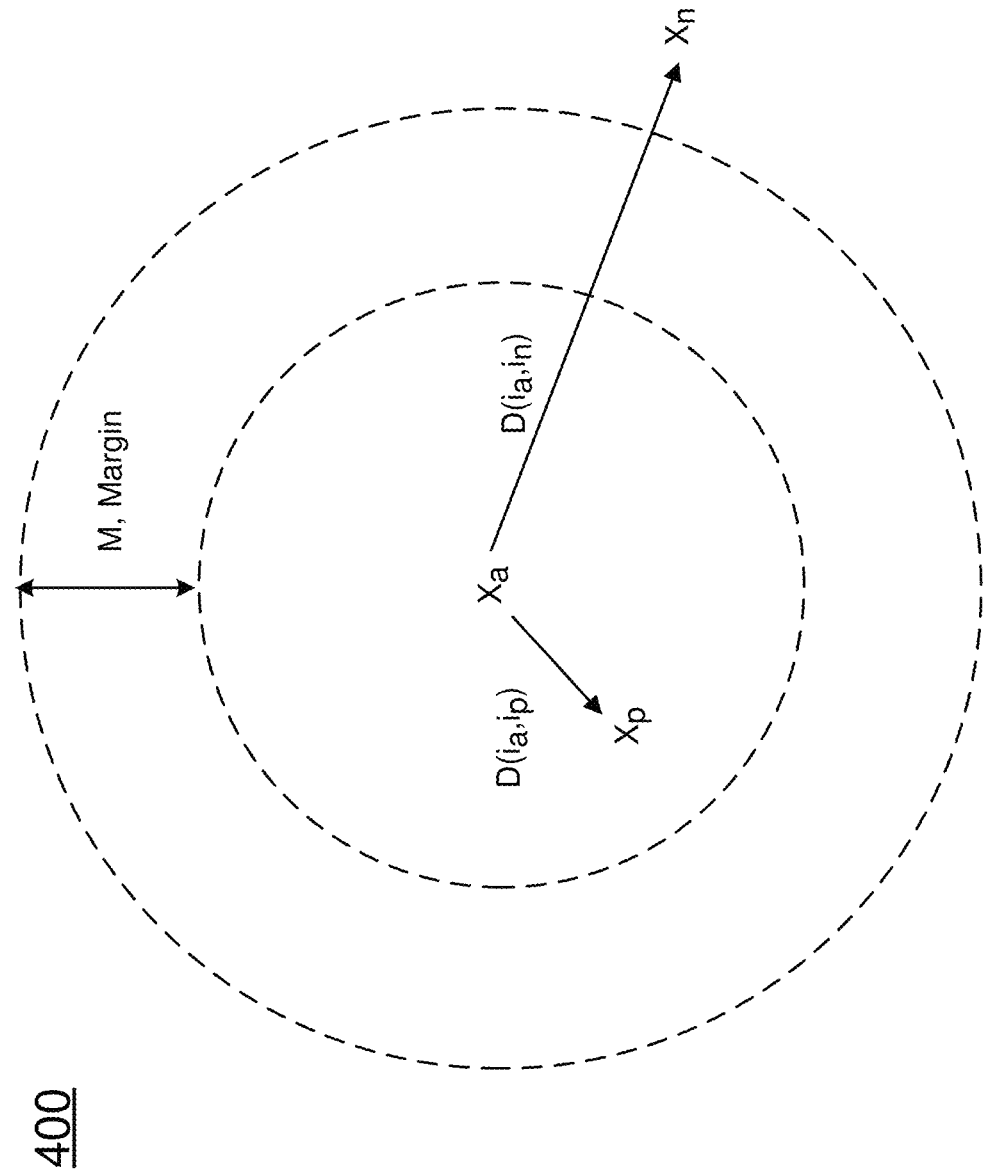
FIG. 4 depicts an example of graphical representation of vector representations of the latent spaces.

FIG. 4 depicts an example graphical representation 400 of the vector representations of the one or more latent space representations. The one or more latent space representations can be used to identify the similarities and differences between image representations. In some implementations, a neural network can embed similarity by translating an image representation into one or more vector representations that describe the one or more latent space representations. The one or more vector representations can be a space where image representations that are similar are closer in distance than image representations that are dissimilar. This embedding of the one or more latent space representations into one or more vector representations can allow the network to generalize the concept of similarity based on the training criteria. As shown in the example graphical representation 400, an anchor embedding $X_a$ is close to the positive embedding $X_p$ and further from the negative embedding $X_n$. The distance from $X_a$ to $X_p$ is represented as the vector distance $D(i_a, i_p)$ and the distance from $X_a$ to $X_n$ is the vector distance $D(i_a, i_n)$. The network can be trained such that $$D(i_a, i_p) < D(i_a, i_n) + M$$

where M is a margin defined to establish a distance between the positive and negative examples. In some implementations, the cosine distance can be found to supply the strongest margin during training.

Once the network is trained, the resulting one or more feature vectors can encode the information from the image representation that is required to assess similarity. The one or more feature vectors of two similar image representations can have a small inter-vector distance. The one or more feature vectors of two image representations that contain similar conceptual elements can have a small inter-vector distance.

In some implementations, the underlying dataset can be encoded using an image retrieval network, thus it can be assumed that no image representation for the positive or negative image is known. In these cases, the anchor image representation can be used. Therefore, each anchor image representation can be a segmented portion of the original image relating to a classification. In other cases, each anchor image representation can be the original image relating to a classification. This can be compared to the positive image representation, which can be a segmented portion of the positive image or the original positive image. This can also be compared to the negative image representation, which can be a segmented portion of the negative image or the original negative image. It is therefore possible to train the network to identify the similarity of the anchor image representation and the positive image representation. It can also train the network to identify the lack of similarity between the anchor image representation and the negative image representation.

Figure 5:
FIG. 5 depicts an example of anchor image, positive image and negative image.

FIG. 5 depicts an example anchor image representation 500, an example positive image representation 510 and an example negative image representation 520. In this example, the image representation 500 consists of a segment class 03.01 of the International Trademark class and used by United States Patent and Trademark Office. This class includes cats, dogs, wolves, foxes, bears, lions, and tigers. The example anchor image representation 500 is that of a dog. The image representation 500 can be a segmented portion of an image relating to the classification. A positive image representation 510 and a negative image representation 520 can be used to train the network.

In the example of a specific triplet as shown in FIG. 5, the computed distance between the anchor and positive embedding is 0.1288. The distance between the anchor and negative embedding is 0.2752. As an additional verification check, the distance between the positive and negative embedding is 0.1770.

To train the network, a triplet loss function can be used. This loss function takes three embeddings, one for the anchor, the positive example, and the negative example. As described above, the cosine distance between the resulting one or more feature vectors can be used to compute the relationship between the anchor and positive example $D(i_a, i_p)$ and the anchor and negative example $D(i_a, i_n)$:

$$\ell(a,p,n) = \{l_{1,c}, \ldots, l_{N,c}\}^T,$$

$$l_s = \max\{d(a_i, p_i) - d(a_i, n_i) + M, 0\},$$

where $d(x_i, y_i) = \|x_i - y_i\|_p$

In some aspects, selection of the positive and negative cases can be key in training a one-shot metric learning network. The positive cases need to share a classification with the anchor image representation, but do not necessarily need to share exactly the same classifications. This can allow the network to learn a per-class differentiation embedding. The negative cases should not share this primary classification. Again, if there is overlap in the non-anchor classification the network can learn a more granular differentiation embedding.

In some implementations, offline triplet mining can be used. For example, a direct method for determining anchor, positive, and negative image representations can pre-compute a set of positive and negative examples for each segment. A set of positive examples can be computed for each segment by, for example, simply including the image representations that share the segment's classifications. The negative set can be any image representation that is not in the positive set. This method can be a most direct method of identifying triplets and may not specifically tax the network by identifying cases that will result in strengthening the embeddings. In some implementations, an image that resembles the anchor image but less so than the positive image can be selected as the negative image.

In some implementations, online batch-hard triplet mining can be used. For example, for each batch of image representations provided for training, for each item in the batch, all of the possible positive examples can be identified. From this list of positive examples, the network can evaluate all of the positive image representation embeddings and compare them against the anchor embedding. The example with the largest $D(i_a, i_p)$ comparison value can be chosen. This represents the positive example that is most likely to be considered negative. Next, for each item in the batch, all of the possible negative examples can be chosen. The negative example embedding with the smallest $D(i_a, i_n)$ can represent the image representation that is most similar to the anchor embedding.

Additionally, this implementation of online batch-hard triplet mining can add the constraint that image representations may only appear once as a positive example and once as a negative example. This can avoid cases where a single misclassified classified image representation may cause the entire batch to poorly train. This can be accomplished by ordering the batch such that the item with the fewest possible positive examples can be evaluated first. Any anchor segment for which an appropriate positive or negative image representation was not found can be dropped from the batch.

To evaluate the effectiveness of this training scheme, at each epoch the number of correctly identified triplets where $D(i_a, i_p) < D(i_a, i_n) + M$ can be used as a convergence metric and served as a stronger indicator of network performance than simply tracking network loss. In some implementations, providing only hard examples can give the network the worst-case scenario for training.

FIG. 6A depicts an example anchor image representation 600, an example positive image representation 610 and an example negative image representation 620. In FIG. 6A example, the one or more latent space representations can be encoded to indicate that if a donkey is the query, the two donkey images representations 600 and 610 are close (similar), and the first donkey image representation 600 and image representation 620 of the octopus are not close (dissimilar). It should be noted that without using the techniques of the present disclosure, the two donkey image representations 600 and 610 would not be found to be similar as they look different. In another example where the query is a hat, the two donkey image representations 600 and 610 can be determined to be not close (dissimilar).

FIG. 6B depicts an example anchor image representation 630, an example positive image representation 640 and an example negative image representation 650. In FIG. 6B example, the one or more latent space representations can be encoded to indicate that the second circle image representation 640 is close (similar) to the first circle image representation 630. However, although the image representation 650 of the building has some circles, the one or more latent space representations can be encoded to indicate that the first circle image representation 630 and the building image representation 650 are not close (dissimilar). On the other hand, some typical technology using pixel-to-pixel comparison may determine that the second circle image representation 640 and the building image representation 650 are similar because the number of white pixels in each image are substantially equal and the number of dark pixels in each image are also substantially equal.

In some implementations, when one feature of an image can be more significant than another feature, greater weight can be given to the dominant feature for purposes of determining similarity. In some examples, this can be done by providing a weighted set of one or more feature vectors. In some examples, this can be done by providing a linear interpolation for one or more feature vectors. In an example, to encompass all possible combinations of what may be considered a dominant element, all image elements can be considered when determining which segment is dominant. These considerations can vary per implementations. FIG. 7 depicts example of an image 700 where two dominant features 720 and 722 can be identified. In this example, feature 730 (stars) can be identified as not dominant. In another example, text within an image can be considered as not a dominant feature.

The network can be trained using one set of data and applied to image document retrieval from various sets of data. For example, in a transfer learning application, the one-shot metric learning network trained on one dataset can translate to another query set.

Referring briefly back to FIG. 1, within the example context of document or image retrieval, the search results 180 can be achieved by selecting a set of one or more feature vectors from the feature vector database 170 that most closely match the one or more feature vectors 150 using the feature vector comparison 160. In this case, the one or more feature vectors 150 can be considered the query to the feature vector database 170. The document 105 can be considered the query document. The image representation 110, which can contain image segmentations 120, can be considered the query image representation. The search results 180 can be a set that contain the image representations 110 represented by the one or more feature vectors 150. These results can also be a set of documents that contain the image representations 110 represented by the one or more feature vectors 105. In some cases, each document in the search results can refer to one or more image representations for that document.

In some implementations, the search results 180 can be ordered or ranked. For example, when the search results 180 are ordered from most similar to the query document or query image representation, to least similar, the results are considered ranked search results.

In some implementations, a set of external search results 195 can be obtained from a different source or search procedure, such as a text or metadata search. Given this form of results, it is still possible to rerank this set of external search results 195 based on the document results or image representations from the set of external search results 195. For this method of reranking, a query can first be established. The first result in the set of external search results 195 can often be the strongest or closest match in the set of external search results 195. This document or image representation can be substituted for document 105 or image representation 110. If the set of external search results 195 are ranked from strongest to weakest, it is also possible to use a set of the top search results as a set of documents that forms a query document or a set of image representations that forms the query image representation. If the set of external search results 195 are not represented in the document database 190 or the feature vector database 170, then the one or more feature vectors 150 representing the one or more latent space representations for each image representation in the set of external search results 195 can be generated. These one or more feature vector representations 150 can be used for the purpose of this ranking or can be added to the feature vector database 170 while the set of external search results 195 can be added to the document database 190. This can allow each item in the set of external search results 195 to be compared to the one or more feature vectors for the one or more latent space representations of the query image representation. The set of external search results 195 or a portion of the set of external search results 195 can then be reordered based on the feature vector comparison 160 to form a new set of search results 180.

In the technologies described herein, methods can be provided for retrieving documents using images in the documents and is based on intra-image features.

Figure 8:
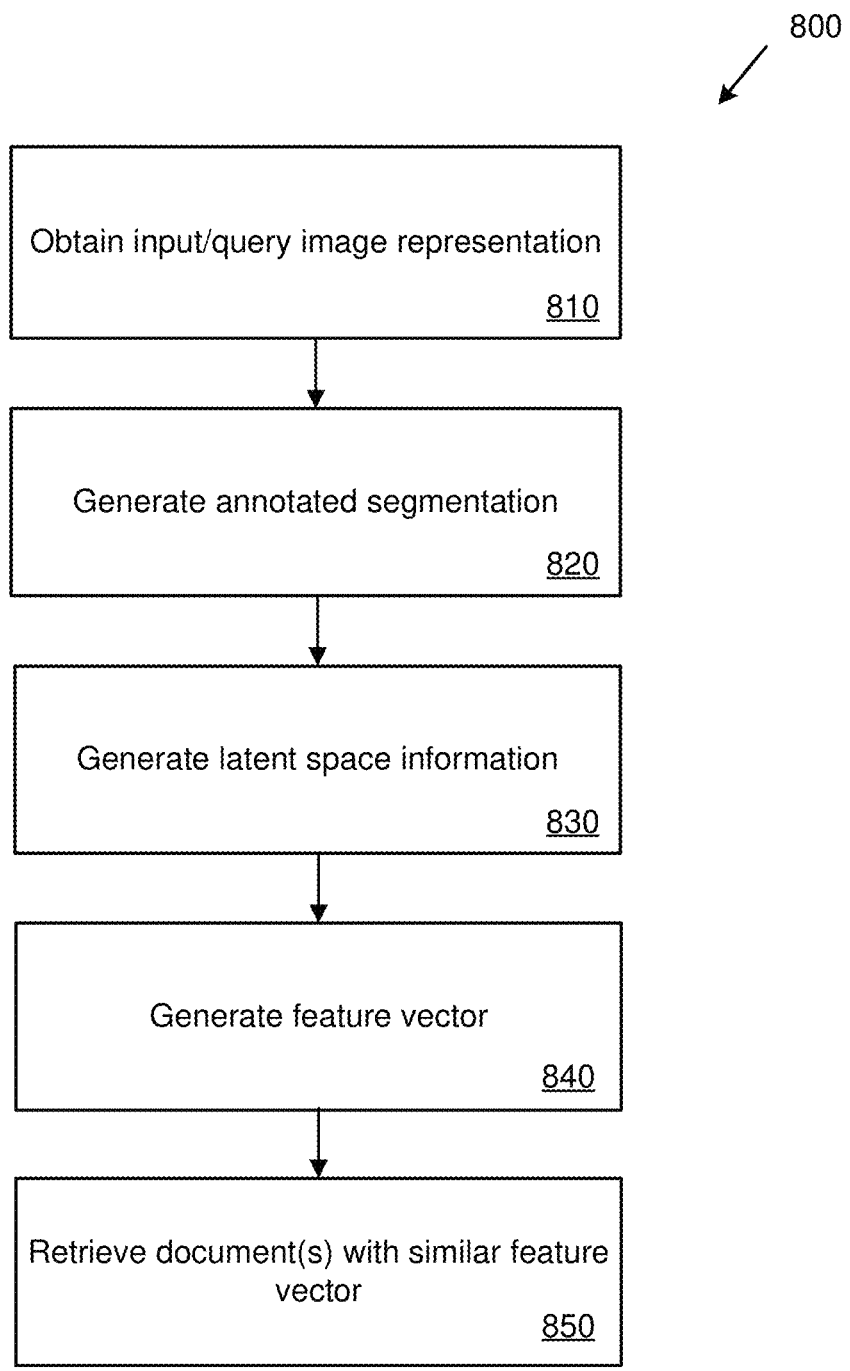
FIG. 8 is a diagram depicting an example process for retrieving documents with embedded image.

FIG. 8 is a diagram depicting an example process 800 for retrieving documents with embedded images. At 810, an image representation can be obtained as input. The image representation can be used as query to retrieve document(s) having one or more embedded image representations that are similar to the input image. At 820, the image representation can include one or more segments. Each segment can further be annotated (or labeled). In some implementations, the segmentation can be based on predefined classes. In an example, International Trademark classes can be used for classification. In some implementations, the labeled segments may form clusters.

At 830, the process 800 can include generating one or more latent space representations for the image. In some implementations, the one or more latent space representations can be generated based on various criteria, for example, classes, dominant features, locations of items, relations among the items and/or the segments, etc. At 840, the process 800 can include generating one or more feature vectors. The feature can encode one or more latent space representations of the image. The one or more feature vectors can be encoded with different granularities based on the details in the one or more latent space representations.

At 850, the process 800 can include retrieving one or more documents. The documents contain one or more images that are determined to be similar to the image input representation. The one or more feature vectors of the input image representation can be compared to the one or more feature vectors of different image representations in the documents to determine their similarity.

Figure 9:
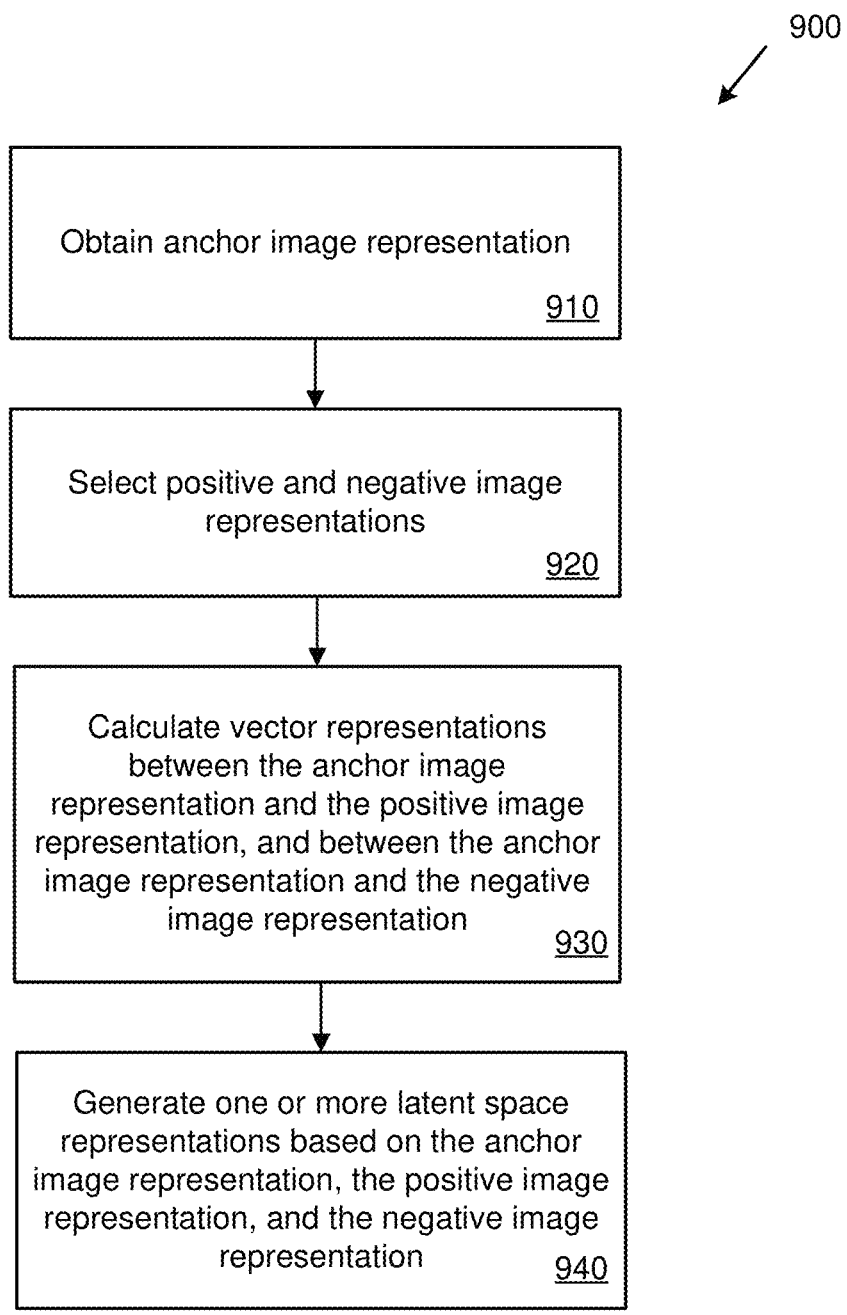
FIG. 9 is a diagram depicting an example process for calculating image vector representations for generating latent space representations.

FIG. 9 is a diagram depicting an example process 900 for calculating image vector representations that can be used, for example, for generating latent space representations. At 910, an image representation can be obtained and used as an anchor image representation. In some implementations, the image representation includes a segment of the image that can be selected as the anchor. At 920, the process 900 can include selecting positive and negative image representations. A positive image representation can be an image representation with a strong similarity with the anchor. A negative image representation has less similarity to the anchor.

At 930, vector representations can be calculated. For example, a first vector representation between the anchor image representation and the positive image representation can be calculated; and a second vector representation between the anchor image representation and the negative image representation can be calculated. Vector representation can represent one or more latent space representations where image representations that are similar are closer in distance than image representations that are dissimilar. This differentiation can allow the network to generalize the concept of similarity based on selected criteria. The anchor image representation can be calculated to be closer to the positive image representation and further from the negative image representation.

At 940, one or more latent space representations based on the anchor image representation, the positive image representation, and the negative image representation can be generated.

Figure 10:
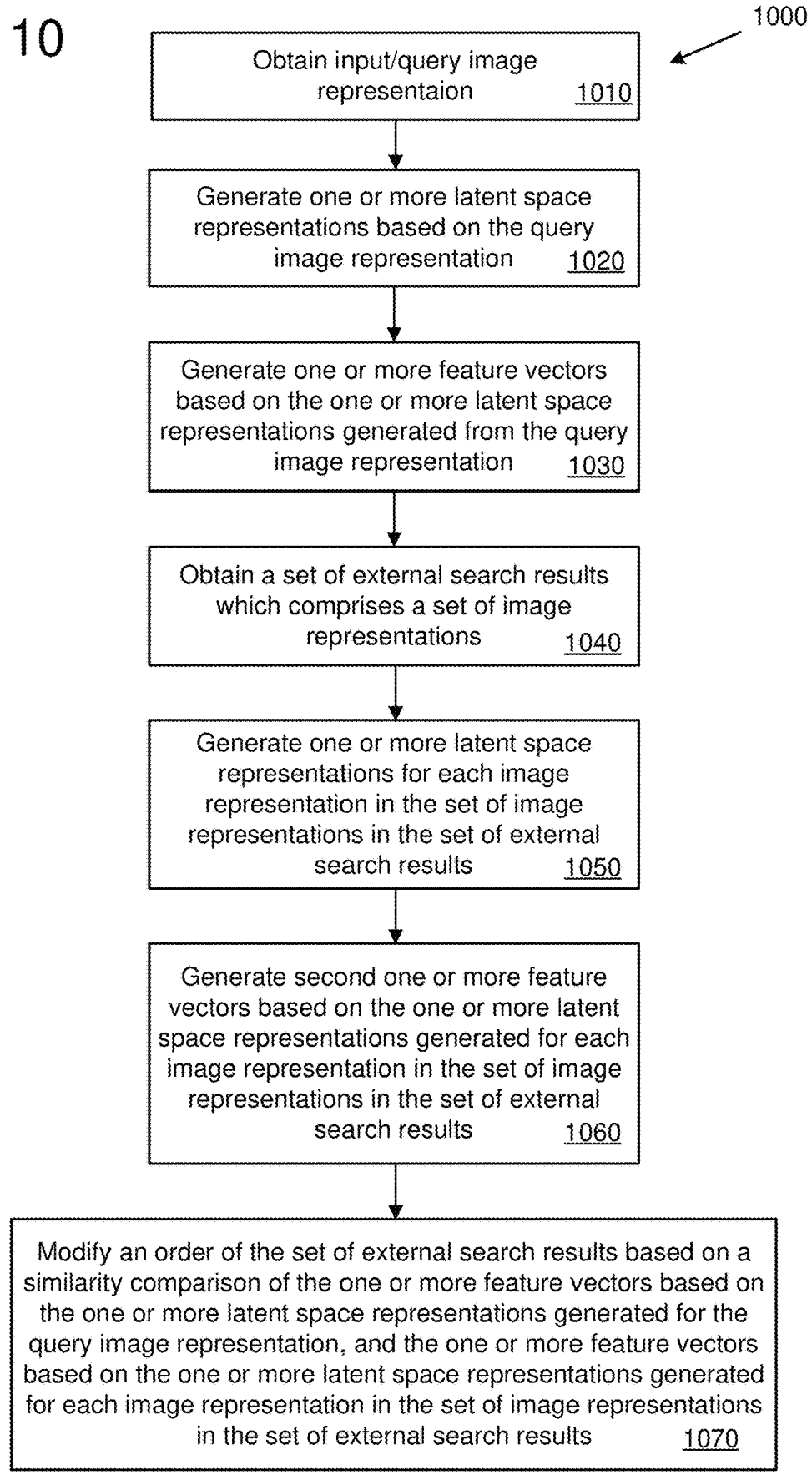
FIG. 10 is a diagram depicting an example process for modifying a ranking order of a search results.

FIG. 10 is a diagram depicting an example process 1000 for modifying a ranking order of a search results. At 1010, an input or query image representation can be obtained. In some implementations, the query image representation can be or can include a complete query image. In some implementations, the query image representation can include one or more segmentations of a query image. In some implementations, the query image representation can include a set of complete images. At 1020, one or more latent space representations can be generated based on the query image representation. At 1030, one or more feature vectors can be generated based on the one or more latent space representations generated from the query image representation.

At 1040, a set of external search results which comprises a set of image representations can be obtained. In some implementations, the set of external search results is a ranked set of search results. At 1050, one or more latent space representations for each image representation in the set of image representations in the set of external search results can be generated. At 1060, second one or more feature vectors based on the one or more latent space representations generated for each image representation in the set of image representations in the set of external search results can be generated.

Then at 1070, an order of the set of external search results based on a similarity comparison of the one or more feature vectors based on the one or more latent space representations generated for the query image representation, and the one or more feature vectors based on the one or more latent space representations generated for each image representation in the set of image representations in the set of external search results can be modified.

Computing Systems

Figure 11:
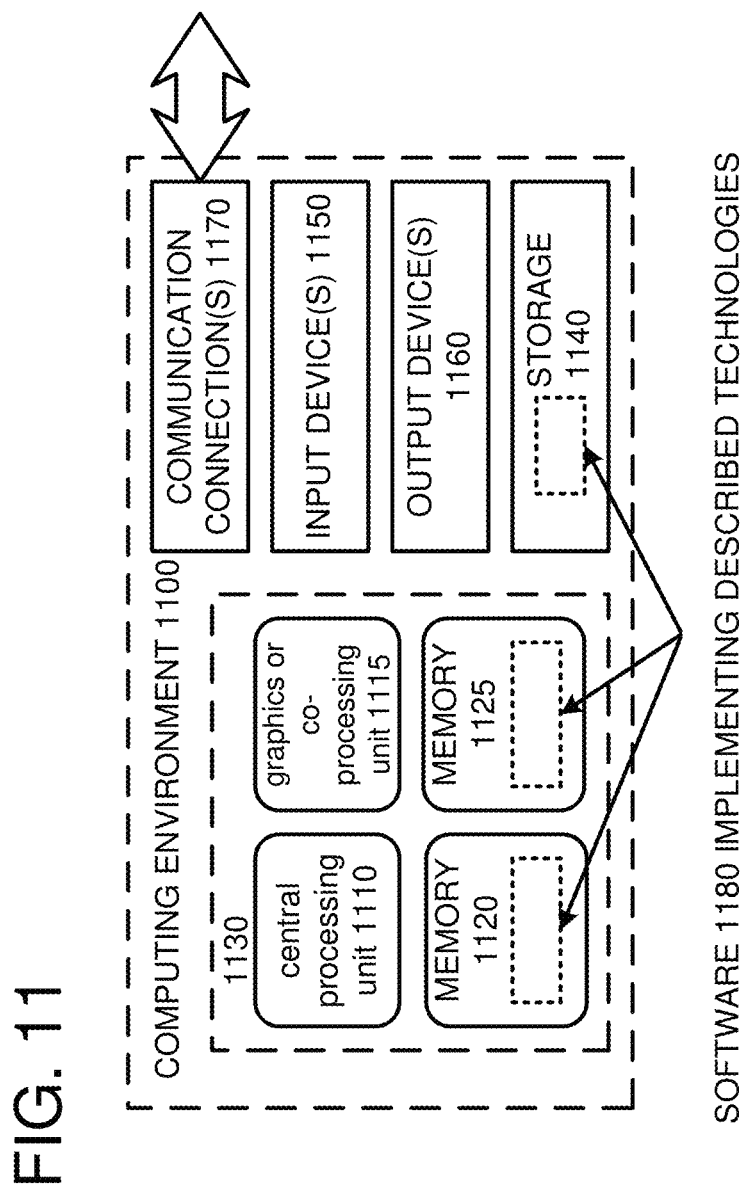
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), nonvolatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device (s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections, such as 1170.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, the method comprising:
    obtaining an image representation comprising two or more segmentations of an image;
    generating one or more latent space representations for each of a first segmentation and a second segmentation of the two or more segmentations;
    generating first one or more feature vectors for the first segmentation and second one or more feature vectors the second segmentation based on the one or more latent space representations;
    determining that the first segmentation is a dominant segmentation in the image representation and the second segmentation is a non-dominant segmentation in the image representation;
    assigning a greater weight to the first one or more feature vectors and a lower weight to the second one or more feature vectors to generate a weighted set of feature vectors;
    comparing the weighted set of feature vectors to one or more other feature vectors, the one or more other feature vectors generated from one or more latent space representations based on one or more other image representations; and
    retrieving, based on the comparing the weighted set of feature vectors to one or more other feature vectors, at least one image representation from the one or more other image representations that has a greater similarity to the dominant segmentation than the non-dominant segmentation;
    wherein the generating the one or more latent space representations for each of the first segmentation and the second segmentation comprises:
        determining an anchor image representation from the respective one of the first segmentation or the second segmentation;
        selecting a positive image representation;
        selecting a negative image representation;
        calculating a first vector representation between the anchor image representation and the positive image representation;
        calculating a second vector representation between the anchor image representation and the negative image representation; and generating the one or more latent space representations based on the anchor image representation, the positive image representation, and the negative image representation.

2. The method of claim 1, further comprising analyzing a location of each of the first segmentation and the second segmentation within the image representation, wherein the determining that the first segmentation is the dominant segmentation is based on the analyzing of the location of each of the first segmentation and the second segmentation within the image representation.

3. The method of claim 1, further comprising analyzing a visual focus of each of the first segmentation and the second segmentation within the image representation, wherein the determining that the first segmentation is the dominant segmentation is based on the analyzing of the visual focus of each of the first segmentation and the second segmentation within the image representation.

4. The method of claim 1, further comprising identifying that the second segmentation is a text element within the image representation and identifying that the first segmentation is a non-text element within the image representation, wherein the determining that the first segmentation is the dominant segmentation is based on the identifying that the second segmentation is the text element and the first segmentation is the non-text element.

5. A method, performed by one or more computing devices, the method comprising:
  obtaining a query image representation comprising two or more segmentations of a query image;
  generating one or more latent space representations for each of the two or more segmentations of the query image representation;
  generating first one or more feature vectors for the first segmentation and second one or more feature vectors for the second segmentation based on the one or more latent space representations;
  determining that the first segmentation is a dominant segmentation in the query image representation and the second segmentation is a non-dominant segmentation in the query image representation;
  assigning a greater weight to the first one or more feature vectors and a lower weight to the second one or more feature vectors to generate a weighted set of feature vectors;
  obtaining a set of external search results which comprises a set of image representations;
  generating one or more latent space representations for each image representation in the set of image representations in the set of external search results;
  generating third one or more feature vectors based on the one or more latent space representations generated for each image representation in the set of image representations in the set of external search results; and
  modifying an order of the set of external search results based on a similarity comparison of the weighted set of feature vectors and the third one or more feature vectors based on the one or more latent space representations generated for each image representation in the set of image representations in the set of external search results.

6. The method of claim 5, wherein the set of image representations is a set of complete images.

7. The method of claim 5, wherein the set of image representations comprises one or more segmentations of the set of image representations.

8. The method of claim 5, wherein the query image representation is a first image representation returned in the set of external search results.

9. The method of claim 5, wherein the query image representation is a combination of one or more image representations returned in the set of external search results.

10. The method of claim 5, wherein the set of external search results is a ranked set of search results ranked in a first order based on at least one of a text search or a metadata search, and wherein the modifying the order of the set of external search results comprises reranking the set of external search results to a second order, wherein the second order is different from the first order, wherein a first image representation in the set of search results ranked in the second order is more similar to the dominant segmentation than the non-dominant segmentation.

11. The method of claim 10, wherein the set of images in the ranked set of external search results is a subset of a top results in the set of external search results.

12. The method of claim 5, further comprises training a neural network to generate the one or more latent space representations for each of the first segmentation and the second segmentation of the two or more segmentations of the query image representation.

13. The method of claim 5, wherein the generating of the one or more latent space representations for each image representation in the set of image representations comprises:
  determining an anchor image representation for each image representation in the set of image representations;
  selecting a positive image representation;
  selecting a negative image representation;
  calculating a first vector representation between the anchor image representation and the positive image representation;
  calculating a second vector representation between the anchor image representation and the negative image representation; and
  generating the one or more latent space representations based on the anchor image representation, the positive image representation, and the negative image representation.

14. The method of claim 13, wherein the generating of the one or more latent space representations for each image representation in the set of image representations further comprises:
  identifying, using online batch-hard triplet mining, all of the positive image representations for each image representation in the set of image representations; and
  comparing all of the identified positive image representations against the anchor representation for the respective image representation.

15. The method of claim 5, further comprising analyzing a location of each of the first segmentation and the second segmentation within the query image representation, wherein the determining that the first segmentation is the dominant segmentation is based on the analyzing of the location of each of the first segmentation and the second segmentation within the query image representation.

16. The method of claim 5, further comprising analyzing a visual focus of each of the first segmentation and the second segmentation within the query image representation, wherein the determining that the first segmentation is the dominant segmentation is based on the analyzing of the visual focus of each of the first segmentation and the second segmentation within the query image representation.

17. The method of claim 5, further comprising identifying that the second segmentation is a text element within the query image representation and identifying that the first segmentation is a non-text element within the query image representation, wherein the determining that the first segmentation is the dominant segmentation is based on the identifying that the second segmentation is the text element and the first segmentation is the non-text element.

18. The method of claim 5, wherein the set of external search results are based on a text search of an image database.

19. The method of claim 5, wherein the set of external search results are based on a metadata search of an image database.

20. One or more computing devices comprising:
   processors; and
   memory;
   the one or more computing devices configured, via computer-executable instructions, to perform search results order modification, the operations comprising:
     obtaining a query image representation comprising two or more segmentations of a query image;
     generating one or more latent space representations for each of the two or more segmentations of the query image representation;
     generating first one or more feature vectors for the first segmentation and second one or more feature vectors for the second segmentation based on the one or more latent space representations;
     determining that the first segmentation is a dominant segmentation in the image representation and the second segmentation is a non-dominant segmentation in the image representation;
     assigning a greater weight to the first one or more feature vectors and a lower weight to the second one or more feature vectors to generate a weighted set of feature vectors;
     obtaining a set of external search results which comprises a set of image representations;
     generating one or more latent space representations for each image representation in the set of image representations in the set of external search results;
     generating third one or more feature vectors based on the one or more latent space representations generated for each image representation in the set of image representations in the set of external search results; and
   modifying an order of the set of external search results based on a similarity comparison of the weighted set of feature vectors and the third one or more feature vectors based on the one or more latent space representations generated for each image representation in the set of image representations in the set of external search results.

* * * * *

UNITED STATES PATENT AND TRADEMARK OFFICE
CERTIFICATE OF CORRECTION

| | | |
|---|---|---|
| PATENT NO. | : 12,169,518 B2 | Page 1 of 1 |
| APPLICATION NO. | : 17/722156 | |
| DATED | : December 17, 2024 | |
| INVENTOR(S) | : Flagg et al. | |

It is certified that error appears in the above-identified patent and that said Letters Patent is hereby corrected as shown below:

In the Claims

Column 16, Lines 31-33, Claim 1 "generating first one or more feature vectors for the first segmentation and second one or more feature vectors the second segmentation" should read -- generating first one or more feature vectors for the first segmentation and second one or more feature vectors for the second segmentation --

Signed and Sealed this
Fifteenth Day of April, 2025

Coke Morgan Stewart
*Acting Director of the United States Patent and Trademark Office*